United States Patent
Yeon et al.

(10) Patent No.: US 10,435,598 B2
(45) Date of Patent: Oct. 8, 2019

(54) ADHESIVE BONDING COMPOSITION FOR OPTICAL USE, METHOD FOR MULTISTAGE CURING THEREOF, AND IMAGE DISPLAY DEVICE

(71) Applicant: LG Chem, Ltd., Seoul (KR)

(72) Inventors: Bo-Ra Yeon, Gyeonggi-do (KR); Bu-Gi Jung, Gyeonggi-do (KR); Sang-Hwan Kim, Gyeonggi-do (KR); Kyung-Joon Yoon, Gyeonggi-do (KR); Jang-Soon Kim, Gyeonggi-do (KR); Won-Gu Choi, Gyeonggi-do (KR)

(73) Assignee: LG Chem, Ltd. (KR)

( * ) Notice: Subject to any disclaimer, the term of this patent is extended or adjusted under 35 U.S.C. 154(b) by 161 days.

(21) Appl. No.: 15/535,298

(22) PCT Filed: Dec. 2, 2015

(86) PCT No.: PCT/KR2015/013045
§ 371 (c)(1),
(2) Date: Jun. 12, 2017

(87) PCT Pub. No.: WO2016/104977
PCT Pub. Date: Jun. 30, 2016

(65) Prior Publication Data
US 2017/0342300 A1 Nov. 30, 2017

(30) Foreign Application Priority Data
Dec. 23, 2014 (KR) .................. 10-2014-0186835

(51) Int. Cl.
| | | |
|---|---|---|
| *C09J 133/10* | (2006.01) | |
| *C09J 133/08* | (2006.01) | |
| *C09J 5/00* | (2006.01) | |
| *C08F 220/06* | (2006.01) | |
| *C08F 2/48* | (2006.01) | |
| *G02F 1/13* | (2006.01) | |

(52) U.S. Cl.
CPC .............. *C09J 133/10* (2013.01); *C08F 2/48* (2013.01); *C08F 220/06* (2013.01); *C09J 5/00* (2013.01); *C09J 133/08* (2013.01); *C08F 2500/17* (2013.01); *C08F 2800/20* (2013.01); *C09J 2203/318* (2013.01); *C09J 2205/31* (2013.01); *G02F 1/13* (2013.01); *G02F 2201/50* (2013.01); *G02F 2202/022* (2013.01); *G02F 2202/28* (2013.01)

(58) Field of Classification Search
CPC .............................. C09J 133/08; C09J 133/10
See application file for complete search history.

(56) References Cited

U.S. PATENT DOCUMENTS

| | | | |
|---|---|---|---|
| 5,639,811 A | 6/1997 | Plamthottam et al. | |
| 2012/0328890 A1 | 12/2012 | Niimi et al. | |

FOREIGN PATENT DOCUMENTS

| | | | |
|---|---|---|---|
| JP | 2007161908 A | 6/2007 | |
| JP | 2008007632 A | 1/2008 | |
| JP | 2012046658 A | 3/2012 | |
| JP | 4971529 B2 | 7/2012 | |
| JP | 2014119557 A | 6/2014 | |
| JP | 2016098304 A | 5/2016 | |
| KR | 100153746 B1 | 11/1998 | |
| KR | 100485626 B1 | 1/2006 | |
| KR | 20120045346 A | 5/2012 | |
| WO | 2009154138 A1 | 12/2009 | |
| WO | 2013173977 A1 | 11/2013 | |
| WO | 2014109223 A1 | 7/2014 | |

OTHER PUBLICATIONS

Machine translation of JP2012046658. (Year: 2012).*
Search Report from International Application No. PCT/KR2015/013045, dated Mar. 10, 2016.

* cited by examiner

*Primary Examiner* — Wenwen Cai
(74) *Attorney, Agent, or Firm* — Lerner, David, Littenberg, Krumholz & Mentlik, LLP

(57) ABSTRACT

Provided are an adhesive bonding composition for optical use and a multistage curing method thereof, the composition including a methacrylate-based monomer and an acrylate-based monomer, in which a weight ratio of the methacrylate-based monomer to the acrylate-based monomer ranges from about 1:1 to about 1:10.

12 Claims, 1 Drawing Sheet

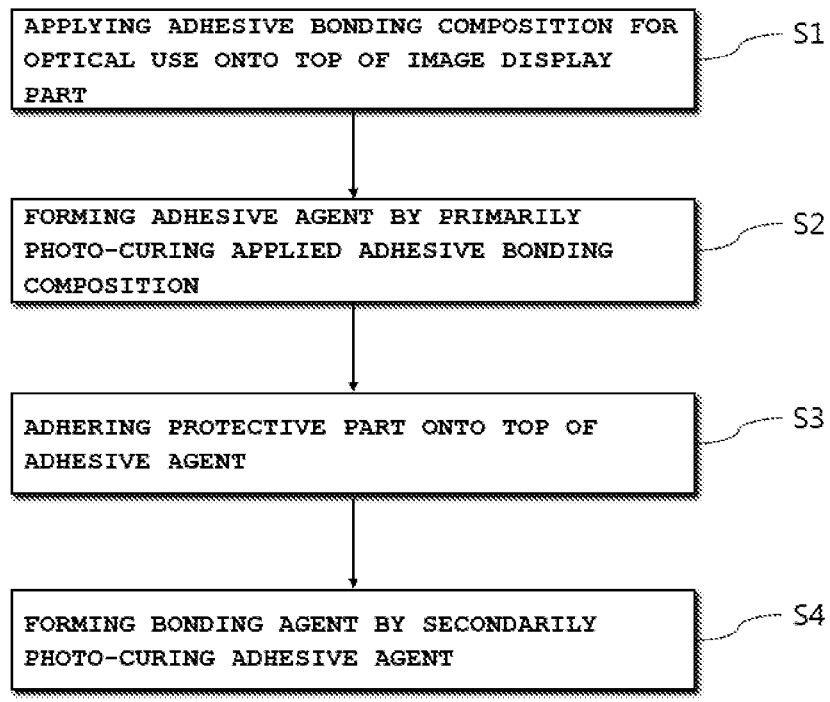
[Figure 1]
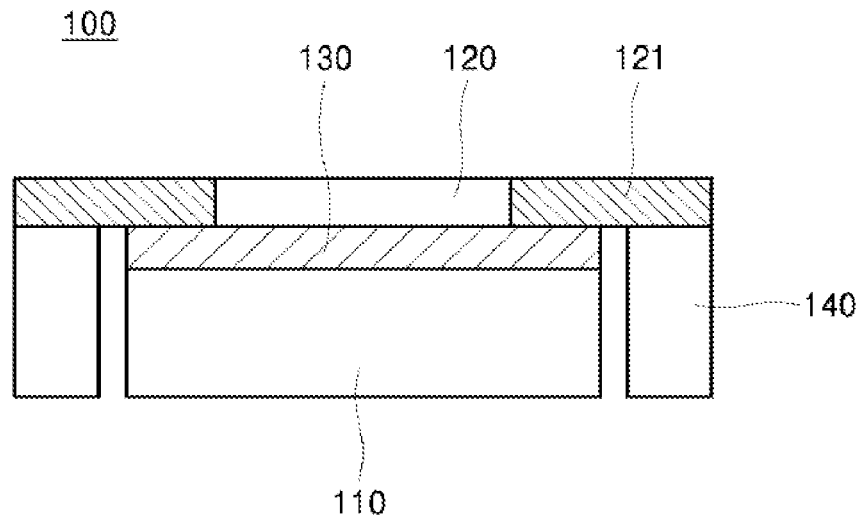
[Figure 2]

ADHESIVE BONDING COMPOSITION FOR OPTICAL USE, METHOD FOR MULTISTAGE CURING THEREOF, AND IMAGE DISPLAY DEVICE

CROSS-REFERENCE TO RELATED APPLICATIONS

The present application is a national phase entry under 35 U.S.C. § 371 of International Application No. PCT/KR2015/013045 filed Dec. 2, 2015, which claims priority from Korean Application No. 10-2014-0186835 filed Dec. 23, 2014, all of which are incorporated herein by reference.

TECHNICAL FIELD

The present invention relates to an adhesive bonding composition for optical use, a method for multistage curing the same, and an image display device.

BACKGROUND ART

In an image display device such as a TV set, a computer, and a mobile device, there exists an air layer in which a space between an image display part and a protective part is filled with air, and the air layer may significantly degrade the visibility. Thus, for example, the visibility is improved by filling the air layer with a transparent acrylic cured product, and the like, a transparent cured product is typically adhered in the form of an adhesive film or an adhesive sheet on an image display part, and subsequently, a transparent cured product is interposed between the image display part and a protective part by adhering the protective part on the adhesive film or the adhesive sheet.

Since the adhesive film or the adhesive sheet is not easily applied to various structures and it is difficult to remove bubbles during the adhesion, the step absorbency capable of absorbing a printing step by a deco film, and the like deteriorates.

DETAILED DESCRIPTION OF THE INVENTION

Technical Problem

An exemplary embodiment of the present invention provides an adhesive bonding composition for optical use, which prevents an overflow phenomenon while implementing excellent bonding strength and excellent step absorbency.

Another exemplary embodiment of the present invention provides a method for multistage curing the adhesive bonding composition for optical use.

Still another exemplary embodiment of the present invention provides an image display device including a bonding layer formed by multistage curing the adhesive bonding composition for optical use.

Technical Solution

An exemplary embodiment of the present invention provides an adhesive bonding composition for optical use, the composition including: a methacrylate-based monomer; and an acrylate-based monomer, in which a weight ratio of the methacrylate-based monomer to the acrylate-based monomer ranges from about 1:1 to about 1:10.

A content of the methacrylate-based monomer may range from about 1 wt % to about 10 wt %.

A content of the acrylate-based monomer may range from about 10 wt % to about 40 wt %.

The adhesive bonding composition for optical use may be applied for a use of bonding an image display part and a protective part in an image display device.

An adhesive agent may be formed by applying the adhesive bonding composition on the image display part, and then primarily photo-curing the adhesive bonding composition, and subsequently, a bonding agent may be formed by adhering the protective part onto a top of the adhesive agent, and then secondarily photo-curing the adhesive agent, thereby bonding the image display part and the protective part.

The adhesive agent may have a viscosity ranging from about 2,000 cps to about 40,000 cps at about 25° C.

The image display part may be a liquid crystal display (LCD).

The protective part may be a glass substrate or a transparent plastic substrate.

The adhesive bonding composition for optical use may further include at least one selected from the group consisting of a (meth)acrylate-based oligomer, a photoinitiator, a plasticizer, and a combination thereof.

A content of the plasticizer may be about 30 wt % or less.

Another exemplary embodiment of the present invention provides a method for multistage curing an adhesive bonding composition for optical use, the method including: applying the adhesive bonding composition for optical use onto a top of an image display part; forming an adhesive agent by primarily photo-curing the applied adhesive bonding composition; adhering a protective part onto the top of the adhesive agent; and forming a bonding agent by secondarily photo-curing the adhesive agent interposed between the image display part and the protective part.

The applied adhesive bonding composition may be primarily photo-cured under a light amount condition ranging from about 100 mJ/cm$^2$ to about 1,000 mJ/cm$^2$.

The adhesive agent may be secondarily photo-cured under a light amount condition ranging from about 2,000 mJ/cm$^2$ to about 6,000 mJ/cm$^2$.

Still another exemplary embodiment of the present invention provides an image display device including: an image display part; a bonding layer formed by multistage photo-curing the adhesive bonding composition for optical use; and a protective part.

An adhesive layer may be formed by applying the adhesive bonding composition on the image display part, and then primarily photo-curing the adhesive bonding composition, and subsequently, a bonding layer may be formed by bonding the protective part onto a top of the adhesive layer, and then secondarily photo-curing the adhesive layer, thereby bonding the image display part and the protective part via the bonding layer.

An bonding strength of the bonding layer with respect to the protective part may range from about 30 N/cm$^2$ to about 100 N/cm$^2$ under a temperature condition of about 25° C.

The bonding layer may have a thickness ranging from about 50 µm to about 300 µm.

The image display part may be a liquid crystal display (LCD).

The protective part may be a glass substrate or a transparent plastic substrate.

Advantageous Effects

The adhesive bonding composition for optical use may prevent an overflow phenomenon while implementing excellent bonding strength and excellent step absorbency.

BRIEF DESCRIPTION OF DRAWINGS

FIG. 1 is a schematic process flow chart of a method for multistage curing an adhesive bonding composition for optical use according to another exemplary embodiment of the present invention.

FIG. 2 is a schematic cross-sectional view of an image display device according to still another exemplary embodiment of the present invention.

BEST MODE

Hereinafter, exemplary embodiments of the present invention will be described in detail with reference to the accompanying drawings so that a person with ordinary skill in the art to which the present invention pertains can easily carry out the present invention. The present invention can be implemented in various different forms, and is not limited to the exemplary embodiments described herein.

An exemplary embodiment of the present invention provides an adhesive bonding composition for optical use, the composition including: a methacrylate-based monomer; and an acrylate-based monomer, in which a weight ratio of the methacrylate-based monomer to the acrylate-based monomer ranges from about 1:1 to about 1:10.

Typically, in an image display device such as a display, a transparent acrylic cured product is interposed in the form of an adhesive film or an adhesive sheet between an image display part and a protective part, and since it is difficult to completely remove bubbles during the process of attaching the adhesive film or the adhesive sheet to the image display device, step absorbency deteriorates, and the adhesive film or the adhesive sheet is not easily applied to structures having different forms.

Thus, the step absorbency may be improved by filling the space between an image display part and a protective part with a liquid bonding composition, and then photo-curing the liquid bonding composition to prevent bubbles from being generated, but during the process of closely adhering the image display part and the protective part via the liquid bonding composition, there occurs an overflow phenomenon in which the bonding composition for optical use is overflowed, and as a result, the raw material loss rate is large and a separate process of removing the bonding composition for optical use with a bonding solvent such as alcohol needs to be added, and accordingly, the productivity and economic efficiency may deteriorate.

Further, when the cure shrinkage is high, warpage may occur because stress occurring in an image display part and a protective part is increased, and accordingly, yellowing or a stain may occur on the image display part.

In an exemplary embodiment of the present invention, since the rate of the photo-curing the adhesive bonding composition for optical use may be appropriately adjusted by adjusting the weight ratio of the methacrylate-based monomer to the acrylate-based monomer in the adhesive bonding composition to a level ranging from about 1:1 to about 1:10, each curing degree may be easily adjusted by using a method for multistage curing the adhesive bonding composition for optical use, which will be described in another exemplary embodiment to be described below, for example, carrying out the photo-curing in two stages with a primary stage and a secondary stage.

Specifically, in a case of adjusting the rate of the photo-curing reaction depending on the weight ratio of a methacrylate-based monomer having a relatively low reactivity and an acrylate-based monomer having a relatively high reactivity, the difference in rates of the photo-curing reaction may be more rapidly confirmed as compared to the case of adjusting the rate of the photo-curing reaction depending on an oligomer having a large molecular weight, and the like, and since the structural difference between the two monomers results from only the presence and absence of a methyl group, even though the weight ratio varies, the compatibility with other compounds is maintained at an excellent level, and accordingly, the curing degree of the adhesive bonding composition for optical use may be more effectively adjusted.

Accordingly, when multistage curing for the adhesive bonding composition for optical use is carried out, there is an advantage in that the cure shrinkage may be further decreased by applying a multistage curing method because the curing degree by each photo-curing reaction may be easily adjusted.

As a result, excellent productivity and economic efficiency may be implemented by preventing an overflow phenomenon via the multistage curing method to decrease the raw material loss rate, time, and costs, and simultaneously, a uniform bonding performance may be implemented for a long period of time by significantly lowering the cure shrinkage to further preventing the warpage phenomenon.

A content of the methacrylate-based monomer may range, for example, from about 1 wt % to about 20 wt %. Since the adhesive agent formed by primarily photo-curing the adhesive bonding composition by the multistage curing method may implement an appropriate adhesive performance by including the methacrylate-based monomer within the range to appropriately adjust the curing rate of the adhesive bonding composition for optical use, a bonding agent formed by secondarily photo-curing the adhesive agent may implement an excellent bonding strength while preventing an overflow phenomenon during the process of closely adhering an image display part and a protective part.

A content of the acrylate-based monomer may range from about 10 wt % to about 40 wt %.

Since the adhesive agent formed by primarily photo-curing the adhesive bonding composition by the multistage curing method may implement an appropriate adhesive performance by including the acrylate-based monomer within the range to appropriately adjust the curing rate of the adhesive bonding composition for optical use, a bonding agent formed by secondarily photo-curing the adhesive agent may implement an excellent bonding strength while preventing an overflow phenomenon during the process of closely adhering an image display part and a protective part.

The methacrylate-based monomer or the acrylate-based monomer may include at least one selected from the group including, for example, methyl (meth)acrylate, ethyl (meth)acrylate, n-propyl (meth)acrylate, isopropyl (meth)acrylate, n-butyl (meth)acrylate, t-butyl (meth)acrylate, sec-butyl (meth)acrylate, pentyl (meth) acrylate, 2-ethylhexyl (meth)acrylate, 2-ethylbutyl (meth)acrylate, n-octyl (meth)acrylate, isooctyl (meth)acrylate, isononyl (meth)acrylate, lauryl (meth)acrylate, tetradecyl (meth)acrylate, acrylic acid, methacrylic acid, 2-(meth)acryloyloxy acetic acid, 3-(meth)acryloyloxy propyl acid, 4-(meth)acryloyloxy butyric acid, 2-hydroxyethyl (meth) acrylate, 2-hydroxypropyl (meth)acrylate, 4-hydroxybutyl (meth)acrylate, 6-hydroxyhexyl (meth)acrylate, 8-hydroxyoctyl (meth)acrylate, 2-hydroxyethylene glycol (meth)acrylate or 2-hydroxypropylene glycol (meth)acrylate, and a combination thereof.

In an exemplary embodiment, the adhesive bonding composition for optical use may be applied for a use of bonding an image display part and a protective part in an image display device, and for example, the image display part and the protective part may be bonded to each other by applying the adhesive bonding composition on the image display part, and then primarily photo-curing the adhesive bonding composition to form an adhesive agent, and subsequently, adhering the protective part onto a top of the adhesive agent, and then secondarily photo-curing the adhesive agent to form a bonding agent.

As described above, it is possible to prevent bubbles from being generated by applying a cured product in the form of a liquid, not in the form of an adhesive film or an adhesive sheet, between the image display part and the protective part.

In addition, it is possible to further decrease the cure shrinkage while effectively preventing an overflow phenomenon via a multistage curing method including forming an adhesive agent by primarily photo-curing the adhesive bonding composition for optical use, and then adhering the protective part, and subsequently forming a bonding agent by secondarily photo-curing the adhesive agent, and the like, and accordingly, since stress occurring in the image display part and the protective part is decreased, a warpage phenomenon is further prevented, and as a result, it is possible to implement a uniform bonding performance for a long period of time.

The adhesive agent may have a viscosity ranging, for example, from about 2,000 cps to about 40,000 cps, and specifically, about 3,000 cps to about 20,000 cps, at about 25° C. By having a viscosity within the range, the image display part and the protective part may be adhered to each other at an excellent level while the adhesive is not overflowed when the image display part and the protective part are closely adhered to each other.

The image display part may be a liquid crystal display (LCD), and for example, an uppermost layer of the image display part may be a polarizing film, but the image display part is not limited thereto. Furthermore, the protective part may be a glass substrate or a transparent plastic substrate, but is not limited thereto.

Thus, a layer-shaped adhesive agent may be formed by applying the adhesive bonding composition for optical use onto, for example, a top of the polarizing film, and then primarily photo-curing the adhesive bonding composition, and subsequently, a layer-shaped bonding agent may be formed by adhering a glass substrate or a transparent plastic substrate onto a top of the layer-shaped adhesive agent, and then secondarily photo-curing the adhesive agent, thereby bonding the polarizing film; and the glass substrate or the transparent plastic substrate.

The adhesive bonding composition for optical use may further include at least one selected from the group consisting of a (meth)acrylate-based oligomer, a photoinitiator, a plasticizer, and a combination thereof.

The (meth)acrylate-based oligomer may include at least one selected from the group consisting of a urethane (meth)acrylate oligomer, a polyester (meth)acrylate oligomer, an epoxy (meth)acrylate oligomer, a polyether (meth)acrylate oligomer, a polybutadiene (meth)acrylate oligomer, and a combination thereof, but is not limited thereto.

The (meth)acrylate-based oligomer may have a weight average molecular weight ranging from about 5,000 g/mol to about 50,000 g/mol. By having a weight average molecular weight within the range, the cure shrinkage may be formed at a low level to prevent the warpage from occurring, and a viscosity may be formed at an appropriate level to implement the curing rate as an appropriately rapid rate.

The photoinitiator may be, for example, an α-hydroxyketone-based compound (for example, IRGACURE 184, IRGACURE 500, IRGACURE 2959, and DAROCUR 1173 manufactured by Ciba Specialty Chemicals Inc.); a phenylglyoxylate-based compound (for example, IRGACURE 754, and DAROCUR MBF manufactured by Ciba Specialty Chemicals Inc.); a benzyldimethylketal-based compound (for example, IRGACURE 651 manufactured by Ciba Specialty Chemicals Inc.); an α-aminoketone-based compound (for example, IRGACURE 369, IRGACURE 907, and IRGACURE 1300 manufactured by Ciba Specialty Chemicals Inc.); a monoacylphosphine-based compound (MAPO) (for example, DAROCUR TPO manufactured by Ciba Specialty Chemicals Inc.); a bisacylphosphene-based compound (BAPO) (for example, IRGACURE 819 and IRGACURE 819DW manufactured by Ciba Specialty Chemicals Inc.); a phosphine oxide-based compound (for example, IRGACURE 2100 manufactured by Ciba Specialty Chemicals Inc.); a metalocene-based compound (for example, IRGACURE 784 manufactured by Ciba Specialty Chemicals Inc.); an iodonium salt (for example, IRGACURE 250 manufactured by Ciba Specialty Chemicals Inc.); and a mixture of at least one thereof (for example, DAROCUR 4265, IRGACURE 2022, IRGACURE 1300, IRGACURE 2005, IRGACURE 2010, and IRGACURE 2020 manufactured by Ciba Specialty Chemicals Inc.), and the like, and is not limited thereto.

In an exemplary embodiment, the content of the plasticizer may be, for example, about 30 wt % or less, may also range, for example, from about 3 wt % to about 20 wt %, and may be specifically about 3 wt % and less than about 10 wt %. By including the plasticizer in a content within the range, the bonding strength may be prevented from being decreased and the migration phenomenon of the plasticizer may be further decreased after the adhesive bonding composition is applied to a product, and as a result, an excellent surface appearance may be implemented and a uniform bonding performance may be implemented for a long period of time.

As described above, the adhesive bonding composition for optical use has an advantage in that the content of the plasticizer may be implemented at an even lower level by appropriately adjusting the weight ratio of the methacrylate-based monomer to the acrylate-based monomer and simultaneously applying a multistage curing method thereof.

In general, when the cure shrinkage is high, the cure shrinkage needs to be alleviated by mixing the plasticizer in a large amount, but since the adhesive bonding composition for optical use may implemented the cure shrinkage at a low level, the content of the plasticizer may be decreased, and accordingly, it is possible to further reduce a phenomenon in which, the plasticizer migrates as time passes after the adhesive bonding composition is applied to a product, so that the residue of the adhesive agent, dirt, and the like are generated and the bonding performance deteriorates.

The plasticizer means encompassing all the types publicly known in the art, and may include at least one selected from the group including, for example, an epoxy-based plasticizer, a fatty acid ester-based plasticizer, a polyester-based plasticizer, a polybutadiene-based plasticizer, and a combination thereof, but is not limited thereto.

Further, the adhesive bonding composition for optical use may further include other additives, and the other additives may include at least one selected from the group including, for example, a surface lubricant, a leveling agent, a softener, a bonding enhancer, an antioxidant, an anti-aging agent, a light stabilizer, a UV absorber, a polymerization inhibitor, and a combination thereof.

As the UV absorber, it is possible to use, for example, a benzotriazole-based UV absorber, a benzophenone-based UV absorber, a salicylic acid-based UV absorber, or a cyanoacrylate-based UV absorber, and the like, and as the antioxidant, it is possible to use, for example, a hindered phenol-based antioxidant, a sulfur-based antioxidant, or a phosphorus-based antioxidant, and the like, and as the light stabilizer, for example, a hindered amine-based light stabilizer and the like may be used, but the additives are not limited thereto, and the type publicly known in the art may be appropriately used according to the object and use of the invention.

FIG. 1 schematically illustrates a process flow chart of a method for multistage curing an adhesive bonding composition for optical use according to another exemplary embodiment of the present invention.

The method for multistage curing an adhesive bonding composition for optical use may include: applying the adhesive bonding composition for optical use onto a top of an image display part (S1); forming an adhesive agent by primarily photo-curing the applied adhesive bonding composition (S2); adhering a protective part onto the top of the adhesive agent (S3); and forming a bonding agent by secondarily photo-curing the adhesive agent interposed between the image display part and the protective part (S4).

The multistage curing method may be, for example, a two-stage curing method of primarily and secondarily curing the composition.

As described above, in a case of adjusting the rate of the photo-curing reaction depending on the weight ratio of a methacrylate-based monomer having a relatively low reactivity and an acrylate-based monomer having a relatively high reactivity, the difference in rates of the photo-curing reaction may be more rapidly confirmed as compared to the case of adjusting the rate of the photo-curing reaction depending on an oligomer having a large molecular weight, and the like, and since the structural difference between the two monomers results from only the presence and absence of a methyl group, even though the weight ratio varies, the compatibility with other compounds is maintained at an excellent level, and accordingly, the curing degree of the adhesive bonding composition for optical use may be more effectively adjusted.

Accordingly, when multistage curing for the adhesive bonding composition for optical use is carried out, there is an advantage in that the cure shrinkage may be further decreased by applying a multistage curing method because the curing degree by each photo-curing reaction may be easily adjusted.

As a result, excellent productivity and economic efficiency may be implemented by preventing an overflow phenomenon via the multistage curing method to decrease the raw material loss rate, time, and costs, and simultaneously, a uniform bonding performance may be implemented for a long period of time by significantly lowering the cure shrinkage to further prevent the warpage phenomenon.

In the multistage curing method, the adhesive bonding composition for optical use may be applied onto the top of the image display part. The adhesive bonding composition for optical use, the image display part, and the protective part are the same as those described in an exemplary embodiment of the present invention.

As a method for applying the adhesive bonding composition for optical use, it is possible to use one of, for example, a die coating method, a gravure coating method, a knife coating method, and a bar coating method, but the method is not limited thereto.

Subsequently, an adhesive agent may be formed by primarily photo-curing the applied adhesive bonding composition, and for example, the applied adhesive bonding composition may be primarily photo-cured under a light amount condition ranging from about 100 mJ/cm$^2$ to about 1,000 mJ/cm$^2$. By primarily photo-curing the applied adhesive bonding composition at a light amount within the range, the viscosity of the adhesive agent may be adjusted at an appropriate level to prevent the overflow phenomenon, and simultaneously, the image display part and the protective part may be sufficiently adhered to each other.

In the multistage curing method, a bonding agent may be formed by secondarily photo-curing the adhesive agent interposed between the image display part and the protective part, and for example, the adhesive agent may be secondarily photo-cured under a light amount condition ranging from about 2,000 mJ/cm$^2$ to about 6,000 mJ/cm$^2$. By secondarily photo-curing the adhesive agent at a light amount within the range, time and costs may not be increased while being capable of bonding the image display part and the protective part at an excellent level.

As described above, the adhesive bonding composition for optical use has an advantage in that the content of the plasticizer may be implemented at an even lower level because the cure shrinkage may be decreased by appropriately adjusting the weight ratio of the methacrylate-based monomer and the acrylate-based monomer, and simultaneously, applying the multistage curing method.

Accordingly, it is possible to further reduce a phenomenon in which the plasticizer migrates as time passes after a bonding agent, a bonding layer, or a bonding film, and the like, which are formed by the adhesive bonding composition for optical use, are applied to a product, so that the residue of the adhesive agent, dirt, and the like are generated and the bonding performance deteriorates.

The bonding agent may be, for example, a bonding layer as a layer-shaped bonding agent, and the bonding layer may be bonded to the protective part with a bonding strength ranging from about 30 N/cm$^2$ to about 100 N/cm$^2$ under a temperature condition of about 25° C. The bonding layer may be bonded with a bonding strength within the range to firmly bond the image display part and the protective part, thereby implementing excellent durability for a long period of time.

Further, the bonding layer may have a thickness ranging from about 50 μm to about 300 μm. By having a thickness within the range, excellent durability and excellent visibility may be implemented by firmly bonding the image display part and the protective part and completely filling the space between the image display part and the protective part.

In addition, in the multistage curing method, for example, an LED lamp, a metal halide lamp, and the like may be used, and specifically, in the case of the primary photo-curing, an LED lamp may be used, and in the case of the secondary photo-curing, a metal halide lamp may be used, but the method is not limited thereto.

FIG. 2 is a schematic cross-sectional view of an image display device 100 according to still another exemplary embodiment of the present invention. Still another exemplary embodiment of the present invention provides the image display device 100 including: an image display part 110; a bonding layer 130 formed by multistage photo-curing the adhesive bonding composition for optical use; and a protective part 120. The adhesive bonding composition for optical use is the same as that described in an exemplary embodiment.

The image display part 110 may be a liquid crystal display (LCD), and for example, an uppermost layer of the image display part 110 may be a polarizing film, but is not limited thereto. Furthermore, the protective part 120 may be a glass substrate or a transparent plastic substrate, but is not limited thereto. A light shielding part 121 may be formed at the edge of the protective part 120.

Specifically, an adhesive layer may be formed by applying the adhesive bonding composition on the image display part 110, and then primarily photo-curing the adhesive bonding composition, and subsequently, a bonding layer 130 may be formed by adhering the protective part 120 onto a top of the adhesive layer, and then secondarily photo-curing the adhesive layer, thereby bonding the image display part 110 and the protective part 120 via the bonding layer 130.

As described above, excellent productivity and economic efficiency may be implemented by preventing an overflow phenomenon via a multistage curing method to decrease the raw material loss rate, time, and costs, and simultaneously, a uniform bonding performance may be implemented for a long period of time by significantly lowering the cure shrinkage to further prevent the warpage phenomenon.

As a method for applying the adhesive bonding composition for optical use, it is possible to use one of, for example, a die coating method, a gravure coating method, a knife coating method, and a bar coating method, but the method is not limited thereto.

A bonding strength of the bonding layer 130 with respect to the protective part 120 may range from about 30 N/cm$^2$ to about 100 N/cm$^2$ under a temperature condition of 25° C. By having an adhesive strength at an excellent level within the range, the image display part 110 and the protective part 120 may be firmly bonded to each other to implement excellent durability for a long period of time.

Further, the bonding layer 130 may have a thickness ranging from about 50 µm to about 300 µm. By having a thickness within the range, an excellent adhesive strength may be implemented, and simultaneously, a gap between the image display part 110 and the protective part 120 may be sufficiently filled up.

Further, the image display device 100 may further include a fixing jig 140 which fixes the protective part 120, and the like. As the fixing jig 140, the type publicly known in the art may be used, and the fixing jig 140 is not particularly limited.

Hereinafter, specific Examples of the present invention will be suggested. However, the Examples described below are only provided for specifically exemplifying or explaining the present invention, and the present invention is not limited thereby.

EXAMPLES

Example 1

15 wt % of lauryl methacrylate as a methacrylate-based monomer, 30 wt % of lauryl acrylate as an acrylate-based monomer, 35 wt % of a polyurethane acrylate oligomer having a weight average molecular weight of 12,000 g/mol, 3 wt % of a photoinitiator, 8 wt % of a polyester-based plasticizer, 2 wt % of a silane coupling agent, and 7 wt % of other additives were mixed and stirred, thereby manufacturing an adhesive bonding composition for optical use.

Example 2 (the case where the content of the methacrylate-based monomer and the acrylate-based monomer is different from that in Example 1)

20 wt % of lauryl methacrylate, 25 wt % of lauryl acrylate, 35 wt % of a polyurethane acrylate oligomer having a weight average molecular weight of 12,000 g/mol, 3 wt % of a photoinitiator, 8 wt % of a polyester-based plasticizer, 2 wt % of a silane coupling agent, and 7 wt % of other additives were mixed and stirred, thereby manufacturing an adhesive bonding composition for optical use.

Comparative Example 1 (the case where the weight ratio of the methacrylate-based monomer to the acrylate-based monomer is less than those in this invention)

20 wt % of lauryl methacrylate, 15 wt % of lauryl acrylate, 29 wt % of a polyurethane acrylate oligomer having a weight average molecular weight of 12,000 g/mol, 3 wt % of a photoinitiator, 31 wt % of a polyester-based plasticizer, and 2 wt % of a silane coupling agent were mixed and stirred, thereby manufacturing an adhesive bonding composition for optical use.

Comparative Example 2 (The case where the weight ratio of the methacrylate-based monomer to the acrylate-based monomer is more than those in this invention)

3 wt % of lauryl methacrylate, 32 wt % of lauryl acrylate, 29 wt % of a polyurethane acrylate oligomer having a weight average molecular weight of 12,000 g/mol, 3 wt % of a photoinitiator, 31 wt % of a polyester-based plasticizer, and 2 wt % of a silane coupling agent were mixed and stirred, thereby manufacturing an adhesive bonding composition for optical use.

Comparative Example 3 (The case where the content of the methacrylate-based monomer is more than those in this invention)

24 wt % of lauryl methacrylate, 5 wt % of lauryl acrylate, 35 wt % of a polyurethane acrylate oligomer having a weight average molecular weight of 12,000 g/mol, 3 wt % of a photoinitiator, 31 wt % of a polyester-based plasticizer, and 2 wt % of a silane coupling agent were mixed and stirred, thereby manufacturing an adhesive bonding composition for optical use.

Comparative Example 4 (The case where the plasticizer is mixed in a content lower than that in comparative Example 2)

3 wt % of lauryl methacrylate, 32 wt % of lauryl acrylate, 35 wt % of a polyurethane acrylate oligomer having a weight average molecular weight of 12,000 g/mol, 3 wt % of a photoinitiator, 25 wt % of a polyester-based plasticizer, and 2 wt % of a silane coupling agent were mixed and stirred, thereby manufacturing an adhesive bonding composition for optical use.

Experimental Examples

An adhesive agent was formed by applying each of the adhesive bonding compositions for optical use according to Examples 1 and 2 and Comparative Examples 1 to 4 to have a thickness of 200 μm on a polarizing film being an uppermost layer of each LCD and primarily photo-curing each of the adhesive bonding compositions at 500 mJ/cm² by means of an LED lamp, and subsequently, a bonding agent was formed by adhering a glass substrate onto a top of the adhesive agent, applying pressure to closely adhere the glass substrate to the adhesive, and then secondarily photo-curing the adhesive agent at 3,000 mJ/cm² by means of a metal halide lamp (Dymax, 5000 EC), and the LCD and the glass substrate were bonded to each other to manufacture an image display device, and during the process of manufacturing the image display device, the adhesive bonding compositions for optical use, physical properties of each adhesive agent and physical properties of each bonding agent were evaluated and are shown in the following Table 1.

The size of the glass substrate was 14 cm×8 cm×1.1 mm, and the bonding agent was a bonding layer formed in the form of a layer and has a size of 13 cm×7 cm×200 mm.

Further, the adhesive bonding composition according to Comparative Example 2 was applied to have a thickness of 200 μm on a polarizing film being an uppermost layer of an LCD, and then a glass substrate was closely adhered on the applied adhesive bonding composition for optical use, and then the adhesive bonding composition for optical use was photo-cured at a time at 3,000 mJ/cm² by means of a metal halide lamp (Dymax, 5000 EC) to form a bonding agent, and the LCD and the glass substrate were bonded to each other to additionally manufacture an image display device, and during the process of manufacturing the image display device, the adhesive bonding composition for optical use, physical properties of the adhesive agent and physical properties of the bonding agent were evaluated and are shown in the following Table 1.

Evaluation Method (Overflow Phenomenon)

Measurement method: the glass substrate was adhered onto a top of each adhesive agent formed by primarily photo-curing the adhesive bonding compositions for optical use according to Examples 1 and 2 and Comparative Examples 1 to 4, during the process of closely adhering the glass substrate to the adhesive, it was observed by the unaided eye whether the adhesive bonding composition for optical use was overflowed out of the edges of the polarizing film and the glass substrate, and a case where the overflow phenomenon occurred was marked with "O" and a case where the overflow phenomenon did not occur was marked with "X".

Additionally, for the adhesive bonding composition for optical use according to Comparative Example 2, during the process of closely adhering the glass substrate on the adhesive bonding composition for optical use, it was observed by the unaided eye whether the adhesive bonding composition for optical use was overflowed out of the edges of the polarizing film and the glass substrate, and a case where the overflow phenomenon occurred was marked with "O" and a case where the overflow phenomenon did not occur was marked with "X".

(Whether Yellowing Occurred)

Measurement method: from the time point when each image display device was manufactured, the image display device was left to stand at 25° C. for at least 3 hours, and subsequently, each image display device was driven, and then it was observed whether there was a portion where a yellow discoloration occurred by observing the edge portion of the glass substrate by the unaided eye, and a case where there occurred the yellowing phenomenon in which the color was discolored into yellow was marked with "O" and a case where the yellowing phenomenon did not occur was marked with "X".

(Bonding Strength)

Measurement method: an adhesive agent was formed by applying each of the adhesive bonding compositions for optical use according to Examples 1 and 2 and Comparative Examples 1 to 4 to have a diameter of 2 cm and a thickness of 200 um onto one slide glass, and primarily photo-curing the adhesive bonding composition at 500 mJ/cm² by means of an LED lamp, and subsequently, a bonding agent was formed by adhering another slide glass onto a top of the adhesive agent, applying pressure to closely adhere the slide glass to the adhesive agent, and then secondarily photo-curing the adhesive agent at 3,000 mJ/cm² by means of a metal halide lamp (Dymax, 5000 EC), and the two slide glasses were bonded to each other.

Subsequently, the peeled force was measured by pulling each slide glass at a rate of 25 mm/min at 25° C. by means of a bonding strength measuring apparatus (Stable Micro Systems, TA XT-PLUS) in a 180° direction.

Additionally, for Comparative Example 1, the bonding strength was measured once again by a separate measurement method, and specifically, the adhesive bonding composition for optical use according to Comparative Example 1 was applied to have a diameter of 2 cm and a thickness of 200 um between two slide glasses and photo-cured, and then the peeled force was measured by pulling each slide glass at a rate of 25 mm/min at 25° C. by means of a bonding strength measuring apparatus (Stable Micro Systems, TA XT-PLUS) in a 180° direction.

(Surface Appearance and Whether Uniform Bonding Performance is Implemented)

Measurement method: after each image display device was put into an oven under conditions of 85° C. and 85% R.H. for 250 hours and left to stand, it was observed by the unaided eye whether the residue of the adhesive agent, dirt, and the like were generated from the surface of each bonding agent, and a case where the residue, dirt, and the like were not generated so that the bonding performance was uniformly maintained was marked with "O", and a case where the residue, dirt, and the like were generated so that the bonding performance deteriorated was marked with "X".

TABLE 1

| | | Overflow phenomenon | Whether yellowing occurred | Bonding strength (N/cm²) | Surface appearance and uniform bonding performance |
|---|---|---|---|---|---|
| Example 1 | | X | X | 45 | O |
| Example 2 | | X | X | 48 | O |
| Comparative Example 1 | | O | X | 32 | X |
| Comparative Example 2 | Two-stage curing | X | X | 13 | X |
| | Single curing | O | O | 29 | X |
| Comparative Example 3 | | O | X | 35 | X |
| Comparative Example 4 | | X | O | 19 | O |

In the case of the bonding layers by the adhesive bonding compositions for optical use according to Examples 1 and 2, the yellowing phenomenon did not occur, and as a result, it is possible to clearly expect that the cure shrinkage will be much lower than those in the Comparative Examples where the yellowing phenomenon occurred, and it could be confirmed that the overflow phenomenon did not occur by multistage curing, and simultaneously, an excellent bonding strength, an excellent surface appearance, and a uniform bonding performance were implemented.

In contrast, in the case of Comparative Examples 1 to 3, the cure shrinkage was good because the plasticizer was mixed in a large amount, but the bonding strength was low, the surface appearance was poor, and the uniform bonding performance was not implemented. In addition, in the case of Comparative Example 2, the yellowing phenomenon occurred because a bonding layer was formed by a single curing, and accordingly, it is possible to clearly expect that the cure shrinkage will be formed at a higher level in the single curing as compared to the two-stage curing.

Furthermore, in the case of Comparative Example 4, a good surface appearance and a uniform bonding performance were implemented because the plasticizer was mixed in a small amount, but the bonding strength was low, particularly, the yellowing phenomenon occurred, and accordingly, it is possible to clearly expect that the cure shrinkage will be relatively much higher than those in the Examples and the other Comparative Examples.

EXPLANATION OF REFERENCE NUMERALS AND SYMBOLS

100: Image display device
110: Image display part
120: Protective part
121: Light shielding part
130: Bonding layer
140: Fixing jig

The invention claimed is:

1. An adhesive bonding composition for optical use, the composition comprising:
    a methacrylate-based monomer;
    an acrylate-based monomer,
    a plasticizer,
    wherein
    a content of the methacrylate-based monomer ranges from 15 wt % to 20 wt %,
    a content of the acrylate-based monomer ranges from 25 wt % to 30 wt %, and
    a content of the plasticizer ranges from 3 wt % to 10 wt %, and
    a weight ratio of the methacrylate-based monomer to the acrylate-based monomer ranges from 1:1.25 to 1:2.

2. The adhesive bonding composition of claim 1, further comprising:
    a (meth)acrylate-based oligomer, a photoinitiator, or a combination thereof.

3. The adhesive bonding composition of claim 1, wherein a bonding strength of a bonding layer which is formed by multi-stage curing of the adhesive bonding composition ranges from 30 N/cm$^2$ to 100 N/cm$^2$ under a temperature condition of about 25° C.

4. A method for multistage curing the adhesive bonding composition of claim 1 comprising:
    applying the adhesive bonding composition of claim 1 onto a top of an image display part;
    forming an adhesive agent by primarily photo-curing the adhesive bonding composition;
    adhering a protective part onto a top of the adhesive agent; and
    forming a bonding agent by secondarily photo-curing the adhesive agent interposed between the image display part and the protective part.

5. The method of claim 4, wherein the adhesive bonding composition is primarily photo-cured under a light amount condition ranging from 100 mJ/cm$^2$ to 1,000 mJ/cm$^2$.

6. The method of claim 4, wherein the adhesive agent is secondarily photo-cured under a light amount condition ranging from 2,000 mJ/cm$^2$ to 6,000 mJ/cm$^2$.

7. An image display device comprising:
    an image display part;
    a bonding layer formed by multistage photo-curing the adhesive bonding composition for optical use according to claim 1; and
    a protective part.

8. The image display device of claim 7, wherein an adhesive layer is formed by applying the adhesive bonding composition on the image display part, and then primarily photo-curing the adhesive bonding composition, and subsequently, a bonding layer is formed by adhering the protective part onto a top of the adhesive layer, and then secondarily photo-curing the adhesive layer, so that the image display part and the protective part are bonded to each other via the adhesive layer.

9. The image display device of claim 7, wherein a bonding strength of the bonding layer with respect to the protective part ranges from 30 N/cm$^2$ to 100 N/cm$^2$ under a temperature condition of about 25° C.

10. The image display device of claim 7, wherein the bonding layer has a thickness ranging from 50 µm to 300 µm.

11. The image display device of claim 7, wherein the image display part is a liquid crystal display (LCD).

12. The image display device of claim 7, wherein the protective part is a glass substrate or a transparent plastic substrate.

* * * * *